United States Patent Office 2,702,582
Patented Feb. 22, 1955

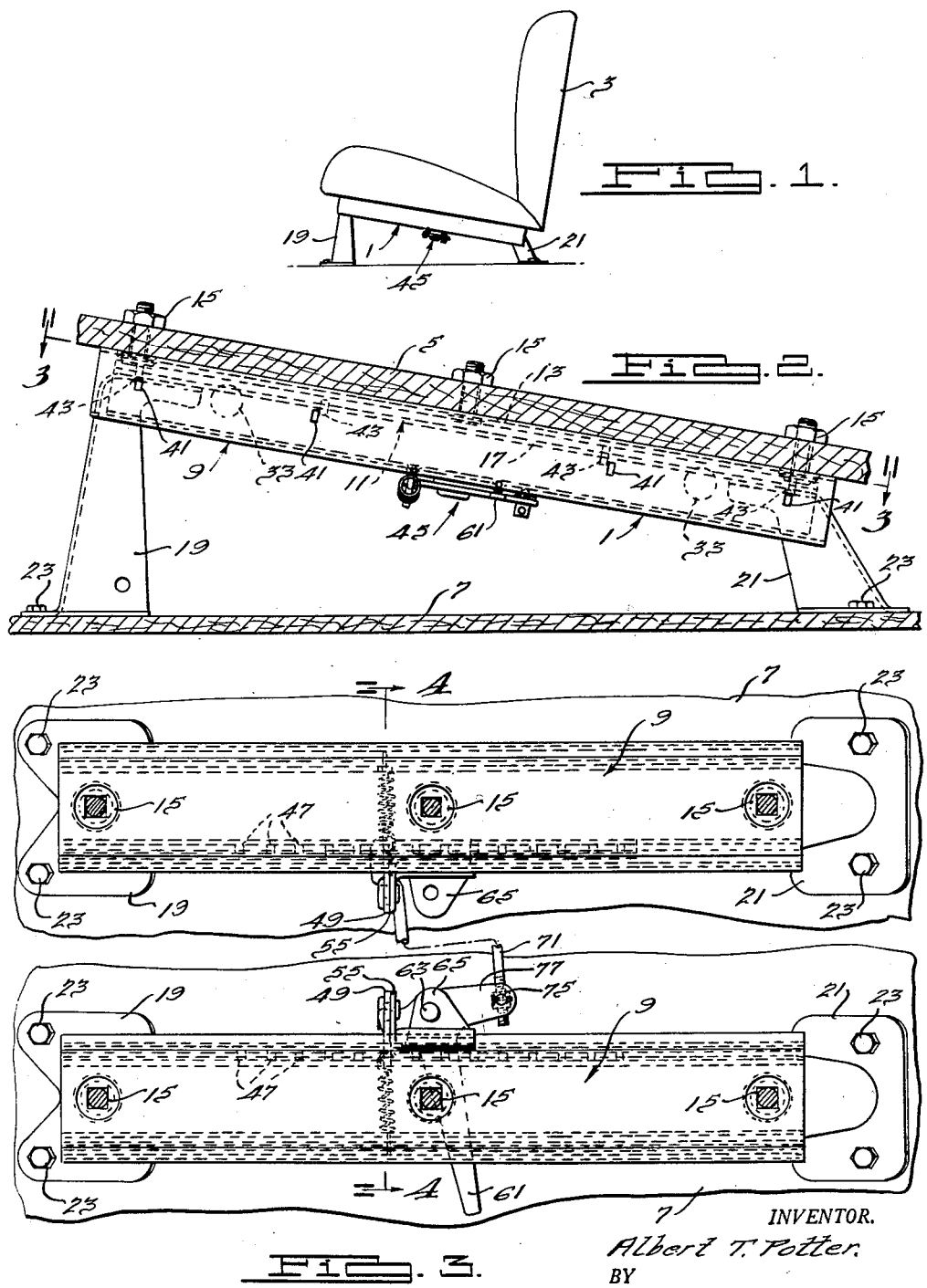

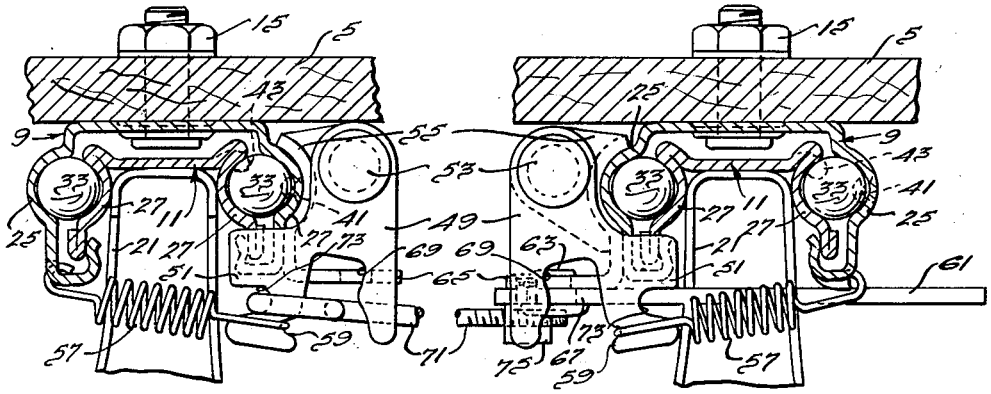

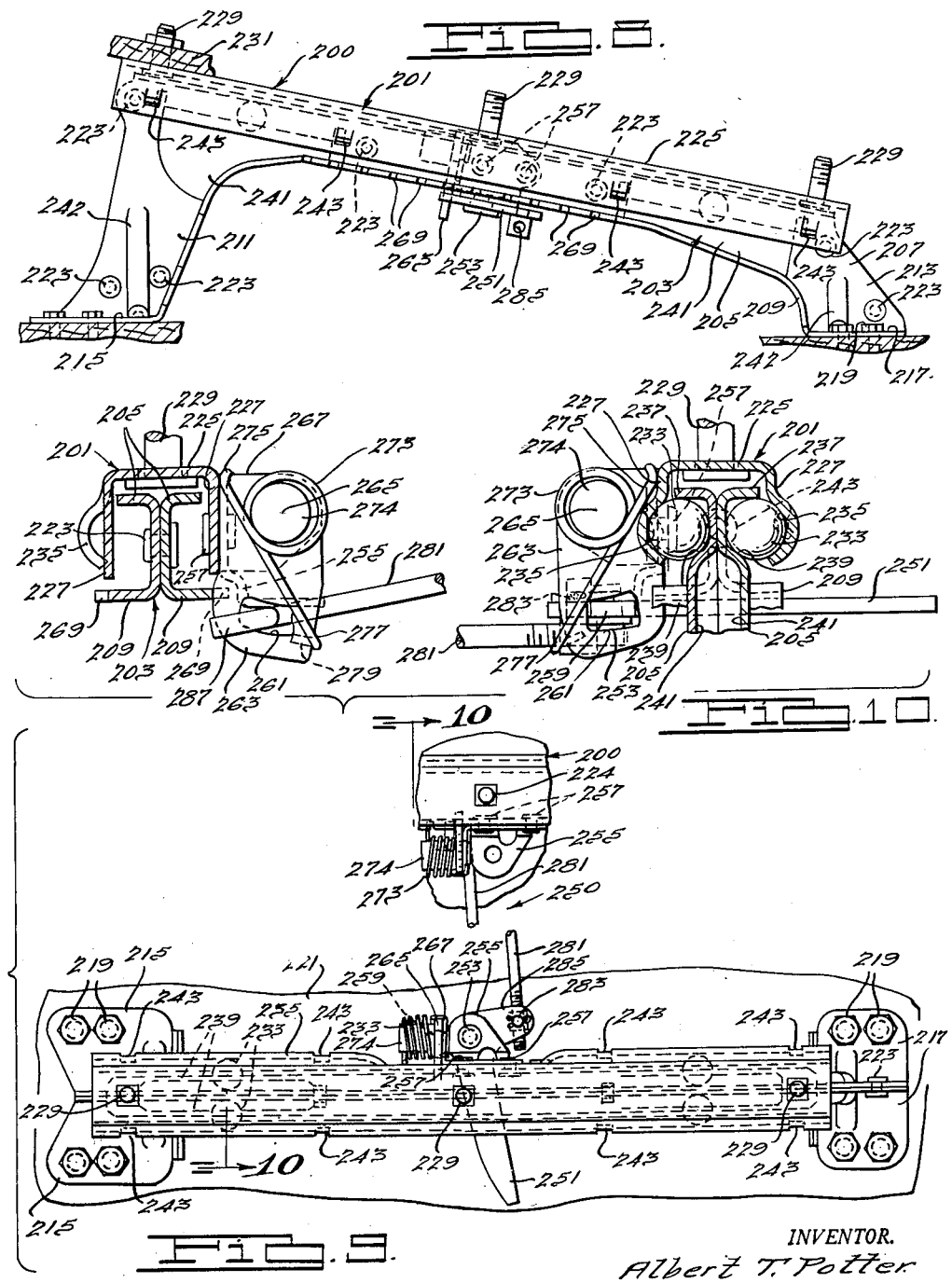

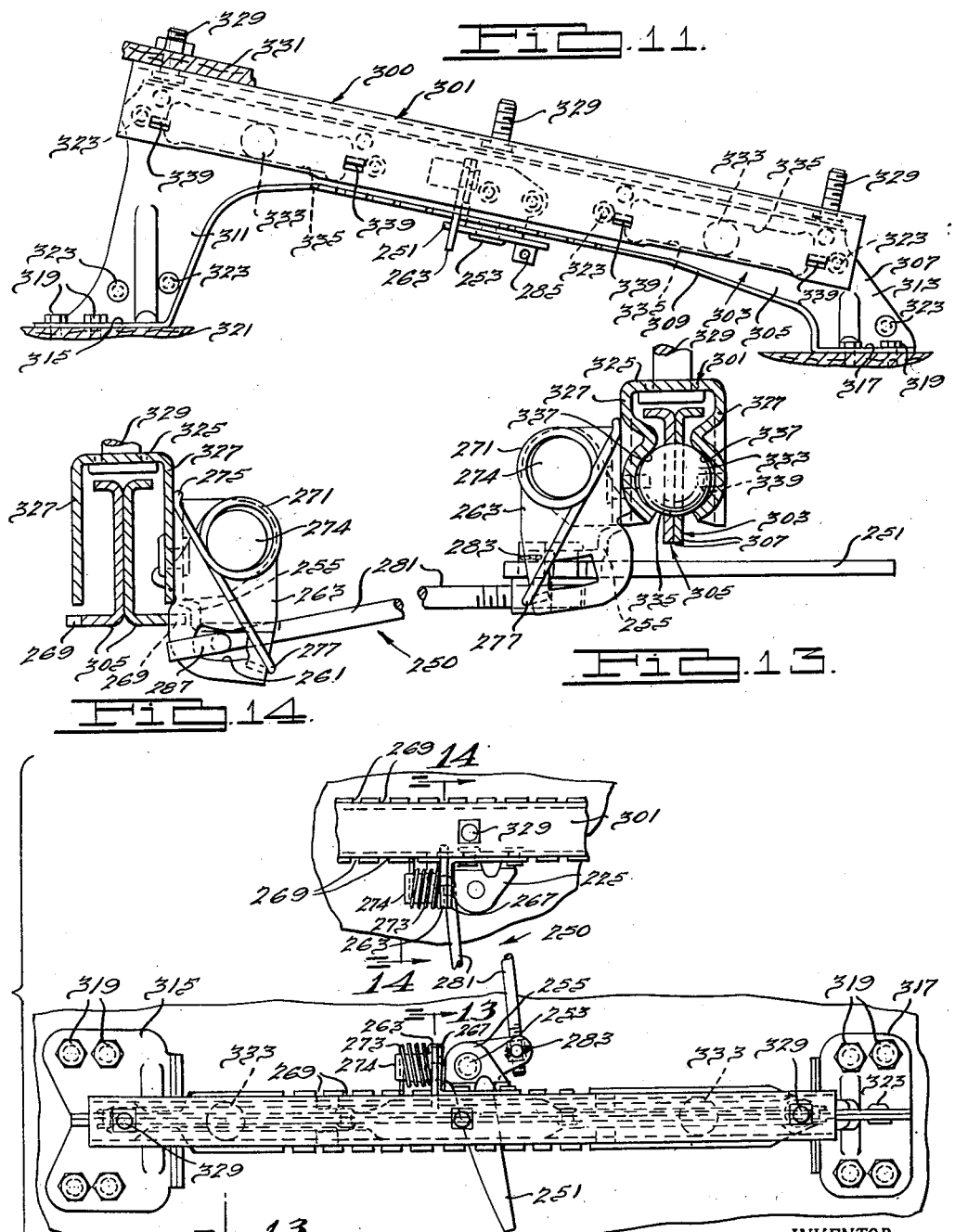

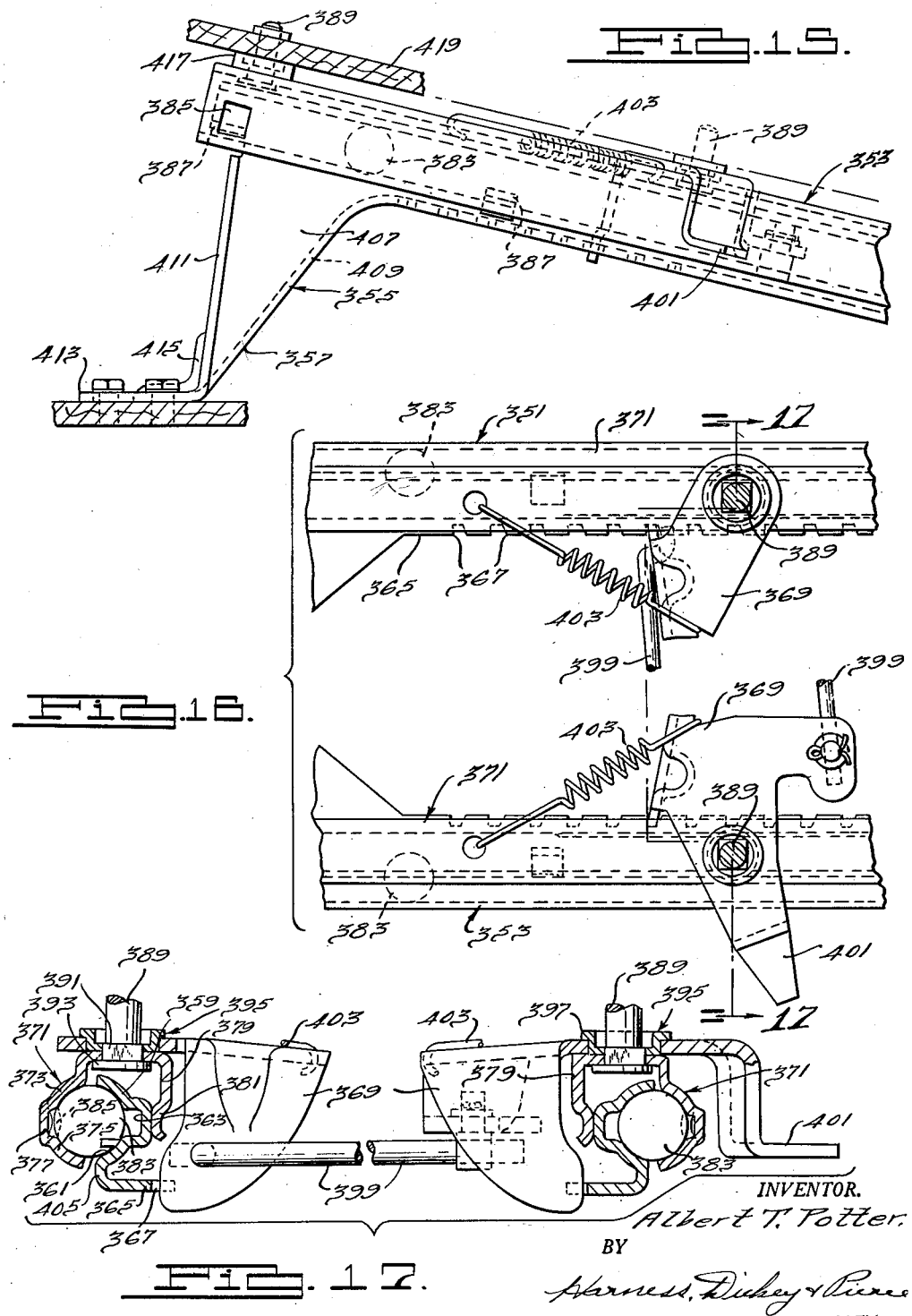

2,702,582

ADJUSTABLE SEAT TRACK CONSTRUCTION

Albert T. Potter, Detroit, Mich., assignor to Ainsworth Manufacturing Corporation, Detroit, Mich., a corporation of Michigan Application April 15, 1950, Serial No. 156,137

2 Claims. (Cl. 155—14)

This invention relates to slide mechanisms and, in particular, to adjustable tracks for supporting vehicle seats so that the occupant thereof may readily change the fore and aft position of the seat.

It is an object of the invention to provide a durable adjustable seat track construction that may be inexpensively manufactured by mass production methods.

Another object is to provide an adjustable seat track construction embodying very few parts, wherein seat loads may be transmitted through rolling elements to the frame upon which the seat is mounted.

Another object is to provide a seat track construction and a latch mechanism wherein the left and right hand track assemblies are interchangeable.

The seat slide of this invention consists essentially of an inner and an outer track that are adjustably interconnected by rolling elements. In the preferred construction, the outer track is a channel-shaped member with downwardly extending legs that have guideways for the rolling elements formed therein and the inner member is provided with supporting surfaces for the rolling elements spaced transversely from the guideways. The inner member transmits load from the rolling elements to the floor and may be of several different constructions, each of which may be readily fabricated from sheet metal. Inasmuch as the load transmitted through the rolling elements from the guideways to the supporting surfaces is non-vertical, there is a tendency to spread the guideways. Means are provided to resist this tendency and resist distortion of the track construction under seat load. The latch devices for the tracks are identical and are simultaneously actuated by a suitable handle and cross rod device.

Other objects and features will appear upon consideration of the accompanying drawings which show constructions illustrating the principles of the invention wherein:

Figure 1 is a side elevation of a seat embodying the present track assemblies;

Fig. 2 is an enlarged side elevation of the adjustable seat mounting structure of this invention;

Fig. 3 is a section taken on line 3—3 of Fig. 2;

Fig. 4 is a section taken on line 4—4 of Fig. 3;

Fig. 5 is an enlarged cross section through the track assembly of Figs. 1-4;

Fig. 6 is a side elevation with parts broken away of a modified form of the invention;

Fig. 7 is a section taken on line 7—7 of Fig. 6;

Fig. 8 is a side elevation, with the seat structure removed, of a modified form of adjustable track construction;

Fig. 9 is a plan view of the construction shown in Fig. 8 with parts broken away;

Fig. 10 is a section taken along the line 10—10 of Fig. 9;

Fig. 11 is a side elevation with the seat removed of another modified form of adjustable track construction;

Fig. 12 is a plan view of the seat construction shown in Fig. 11 with parts removed and broken away;

Fig. 13 is a section taken along the line 13—13 of Fig. 12;

Fig. 14 is a section taken along the line 14—14 of Fig. 12;

Fig. 15 is a broken view of structure, similar to that illustrated in Fig. 11, showing a further form of the invention;

Fig. 16 is a broken plan view of the structure illustrated in Fig. 15; and

Fig. 17 is an enlarged sectional view of the structure illustrated in Fig. 16, taken on the line 17—17 thereof.

The adjustable track assemblies 1 of the present invention are illustrated in conjunction with a seat 3 having a wooden bottom frame or base 5 that is secured to the assemblies 1. Two track assemblies 1 are employed, one at each side of the seat, and they are disposed longitudinally of the seat and mounted upon the floor board 7.

The assemblies 1 are substantially identical, from the standpoint of the invention, and each comprises an outer channel-shaped track 9 and an inner channel-shaped track 11. The outer track is uppermost and has a web 13 that is attached to the seat frame 5 by means of bolts 15. The inner track 11 fits within the track 9 and has a web 17 that is parallel to the web 13 and is welded, or otherwise fixedly secured, to front and rear legs 19 and 21. The legs are fixed to the floor board 7 by suitable bolts 23. Thus, the seat load is transmitted from the outer tracks 9 to the inner tracks 11, and thence through the legs to the floor board 7, and adjustment of the fore and aft position of the seat 3 requires longitudinal movement of the outer tracks 9 with respect to the fixed inner tracks 11.

The channel-shaped tracks 9 and 11 are preferably stampings, and in the course of their manufacture are provided respectively with side legs 25 and 27 that have longitudinally extending transverse bulges or indentations 29 and 31, the bulges 31 being in part formed in upset portions 32 of the webs 17. The legs 25 and 27 are disposed opposite each other on opposite sides of the tracks so that their respective bulges 29 and 31 cooperate to form parallel raceways for balls 33. The balls 33, therefore, provide anti-friction means for relative movement of the outer and inner tracks, and serve also to transmit seat loads from the outer track to the inner track.

As shown in Fig. 5, the bulges 29 and 31 are preferably formed so that the raceways are transversely oblong. The balls thus engage the flanges or legs 25 and 27 in points 35 and 37, respectively, that are spaced transversely a vertical plane through the centers of the balls, i. e., the mid-plane of the raceway. The seat load passing through the balls therefore has a transverse component which tends to spread the legs 25 and 27. This is prevented, however, by rebent flanges 39 formed as extensions of the legs 25. The flanges 39 preferably engage the outsides of the legs 27 by mere abutment so that the assembly 1 may be put together by telescoping the inner and outer tracks. The flanges 39 tie the legs 25 and 27 together to resist spreading under the influence of inclined seat loads through the balls 33. At the top side of the legs spreading is resisted, of course, by the webs 13 and 17.

Two longitudinally spaced raceways are preferably employed, one at the front and one at the rear of each assembly 1. The longitudinal end points are conveniently defined by projections 41 and 43 (Figs. 2 and 4) that are pressed into the legs 25 and 27 in their respective bulges in the paths of balls 33.

Any suitable mechanism 45 may be employed, if desired, to releasably hold the tracks 9 and 11 in adjusted longitudinal position. Preferably, however, and as illustrated, both the inside legs 25 and 27 of the two track assemblies 1 are provided with a longitudinal series of notches 47 that are capable of registering with each other. A lock plate 49 has a tongue 51 that is adapted to fit in the notches of both legs and therefore prevent relative longitudinal movement of the legs, one plate being provided for each assembly 1. The plate 49 is pivoted at 53 to a bracket 55 that is secured in a suitable manner, as by welding, to the face of the leg 25. The plate 49 is urged to locking position by a spring 57 which is anchored at one end in a catch 59 on the plate and at its other end in a suitable hole in the opposite leg 25.

Means are provided to simultaneously release the plates 49 on both assemblies 1. This comprises a T-shaped handle 61 that is journaled on a pin 63 in a bracket 65 secured to and extending transversely from the side of a notched leg 25, a bracket 65 being illustrated on both notched legs 25 as evidence of the interchangeability of the assemblies 1. One arm 67 of the T handle 61 fits in a notch 69 in the plate 49 as clearly shown in Fig. 4 so that by swinging the handle 61 to the left, the plate 49 will be pivoted out of the notches 47 against the resistance of springs 57. The same movement of the other lock plate 49 takes place simultaneously by virtue of the rod 71 that is hooked on a catch 73 on the plate 49 at one end and threaded to a suitable adjustment block 75 welded to the other arm 77 of the T handle 61, since leftward movement of the handle 61 acts through arm 77 to pull the rod 71 against the resistance of spring 57. Thus, both latch plates 49 may be released by movement of the handle 61, and the seat adjusted by sliding the outer tracks 9 on the balls 33 until the desired position is obtained. Upon release of the handle 61, the springs 57 will force the latch plates 49 back into the notches 47 to lock the seat in the desired position.

It will be observed that by modifying the embodiment of Figs. 1–5 so that it is the legs 27 which are provided with the rebent flange to prevent spreading, the notches in leg 25 may be eliminated, since, in this case, the lock plate, being pivoted to the leg 25, may engage suitable notches in the rebent flange to prevent relative movement. The modified structure of Figs. 6 and 7 may be locked in position in this way, as will presently appear.

In the structure of Figs. 6 and 7, the side legs 101 of the outer channel-shaped track 103 have longitudinal bulges 105 therein, as before. In this case, however, only one line of antifriction balls is provided in each track assembly and the balls 33 ride on both legs of the outer member 103. As before, the points of engagement of the balls and legs 101 are spaced transversely of the midplane of the raceway so that the seat load applied by the frame 5 to the track 103 passes non-vertically through the balls 33 and thus exerts a transverse component of force on the legs 101 that tends to spread them apart. The inner track 107 in this modification is T-shaped and may be made by folding a sheet of metal upon itself and then bending the edge portions in opposite directions to form the vertical leg 109 and horizontal arms 111. The leg 109 lies in the midplane of the raceway and therefore is provided with slots 113 to receive the balls 33. The bottom edge of the slot receives seat load from the balls and transfers it through arms 111 to the seat legs 19 and 21. In order to prevent spreading of the legs 101, the arms 111 are provided with flanges 115 that are formed as extensions of rebent portions 117 of the arms. The flanges 115 engage the outsides of the legs 101 and define the maximum spacing thereof. It is evident that by providing the portions 117 with notches, and attaching the locking plate 49 to the leg 103, that means may be had for releasably fixing the relative positions of the tracks 103 and 107.

The seat support of Figs. 8 to 10 comprises two transversely spaced longitudinally extending track constructions 200 which are, for the purpose of this invention, substantially identical. Hence, a description of one will suffice. Each comprises an upper channel-shaped stamping and track member 201 and an inner and lower track member 203. The lower track member 203 comprises a pair of substantially identical stampings 205 that are formed with vertical webs 207 and transverse flanges 209 along their lower edges. The stampings 205 are formed with legs 211 and 213 at the front and rear thereof, respectively, and the flanges 209 on the lower edges of these legs serve as feet 215 and 217 whereby the track 203 may be rigidly secured by means of bolts 219 to the floor board 221 of an automobile or other vehicle. The stampings 205 are riveted back to back, or may be welded together, if desired, suitable rivet connections being shown at 223.

The upper channel track 201 has a transverse web 225 and downwardly extending side flanges or legs 227 that embrace the upper portion of the lower track 203. The web 225 of the upper track 201 is provided with suitable upwardly extending studs 229 by means of which the seat frame may be secured to the track, as fragmentarily illustrated at 231 in Fig. 8.

The upper track 201 is supported on the lower track 203 through the medium of anti-friction balls 233 whereby it may be moved longitudinally of the lower track and of the floor 221. The balls 233 are received and guided in outwardly formed arcuate bulges 235 in the legs 227 of the upper track 201. Two pairs of balls are shown, one pair at the front of the track construction and the other pair at the rear, and the two balls in each pair being disposed at opposite sides of the slide in respective guides 235. The balls 233 are also received in guideways defined in track 203 by transverse flanges 237 at the top edges of the stampings 205 and by the upper surfaces 239 of outwardly facing pockets or depressions 241 formed in each of the stampings 205. Thus, load of the seat on the upper channel 201 is transmitted to the balls 233 from the guides 235, and thence through the balls to the surfaces 239 to the track stampings 205 and thence to the floor 217. It may be observed that the depressions 241 serve as reinforcing ribs to strengthen the stampings 205 and that further reinforcement may be provided by ribs 242 in the legs.

The upper track 201 may be moved relative to the fixed lower track 203 by virtue of the rolling action of the balls 233. During such movement or during normal usage, the balls 233 are confined in the guideways formed in the tracks by inwardly pressed indentations 243 formed in the legs 227 of the upper track 201 at the ends of the bulges 235.

The tracks may be held in any of a plurality of selected adjusted positions by means of suitable latch mechanism 250. A preferred form of latch mechanism comprises a generally T-shaped handle member 251 that is pivoted at 253 to a horizontal flange on a bracket 255 which is riveted at 257 to the inner side leg 227 of the upper track 201. The T-shaped handle 251 has an arm 259 that fits in an aperture 261 that is formed in the vertical web of a latch plate 263 that is pivoted on a horizontal axis 265 to a vertical transversely extending flange 267 of the bracket 255. The flanges 209 on the central portion of the stampings 205 have notches 269 opening into the outer edges thereof which receive the edges of the latch plates 263 to thereby lock the upper track 201 in fixed position relative to the lower track 203. The latch 263 is spring pressed into latched position in the notches 269. This is conveniently accomplished by a torsion spring 273 that fits around a pin 274, containing the axis 265, that is rigidly secured to the latch plate 263. The upper end 275 of the spring 273 bears upon the outer surface of the leg 227 of the upper track 201 while the other and lower end 277 of the spring has a bend formed therein which hooks around a lower portion of the latch plate, as indicated at 279. It is evident that by prestressing the spring 273, the lower end 277 will exert a torque on the latch plate 263, tending to hold it in the notches 269.

The latch mechanism 250 is disengaged to permit movement of the tracks by pivoting the handle 251 in a clockwise direction about its pivot 253. It is evident from Fig. 9 that this movement results in displacement of the arm 259 away from the side of the channel 201 carrying with it, by virtue of engagement in aperture 261, the latch plate 263. Corresponding movement in the track assembly on the opposite side of the seat is accomplished through the medium of the cross rod 281. This rod is adjustably secured at one end at 283 to the other arm 285 of the T-shaped handle 251. The other end of the rod is jogged at 287 and fitted in the aperture 261 of the latch plate 263 that is secured to the opposite track assembly 200. It is evident that clockwise movement of the handle 251 will pull the rod 281 so that abutment of the jog shoulder 287 with the edge of the aperture 261 will pull the latch plate 263 from the notches 269 and thus result in simultaneous release of both of the upper tracks 201 from the lower tracks 203.

In the embodiment of the invention, shown in Figs. 11 to 14, the track construction 300 comprises an upper channel-shaped track element 301 that embraces the lower and inner track element 303. The lower track 303 comprises a pair of stampings 305 that have vertical webs 307 and transverse flanges 309 on their lower edges. The track 303 has front and rear legs 311 and 313, respectively, with feet 315 and 317, formed by the flanges 309, that are secured by bolts 319 to the front board 321. The stampings 305 are arranged so that the vertical webs 307 are back to back and rigidly secured together by suitable means such as rivets 323.

The upper track 301 has a longitudinal web 325 and side legs or flanges 327. The seat is secured to the web 325 by attachment to studs 329 extending therethrough as indicated at 331. The upper track 301 is movably supported on the lower track 303 through the medium of anti-friction balls 333, preferably one such ball being used at the front and one at the rear of each assembly 300. The balls 333 ride in slots 335 that are formed in the webs 307 of the stampings 305. The balls 333 also ride in bulges or guides 337 that are formed in the legs 327 of the upper track 301. The bulges 337 are formed so that the surfaces thereof which engage the balls 333 are located between vertical planes defined by the edges of the web 325, and thus, secure the balls against lateral movement in the slots 335. Inwardly struck ears 339 may be formed in the legs 327 of the channel 301 and spaced apart by a distance corresponding to the desired length of adjustment of the tracks and arranged to project into the path of balls 333 and abut thereagainst to limit longitudinal movement of the track 301. It is evident that the weight of the seat is transmitted through the web 325 to legs 327 of the upper track 301 and then through the balls 333 to the vertical webs 307 of the lower track 303 and thence to the floor board 321.

The adjusting mechanism 250 for the track construction 300 is identical to that described in connection with Figs. 8 to 11 and hence, need not be described again in detail.

Referring to Figs. 15 to 17, the form of invention therein illustrated embodies a pair of spaced track elements 351 and 353, each of which comprises a supporting track portion 355 which is made from a single stamping having at each end a supporting leg 357 connected to a central ball race portion 359. The ball race portion 359 has a substantially semicylindrical portion 361 presenting outwardly with the central portion broken away by a channel-shaped portion 363. Below the semicylindrical portion an outwardly directed flange 365 is provided having a plurality of notches 367 for receiving the detent of a latch 369.

The track portion 371, which is attached to the seat and which slides on the fixed track portions 359, is of channel section having one flange 373 of inwardly presenting semicylindrical shape, the arcuate portions 375 of which are spaced by a channel portion 377. The opposite flange 379 of the channel-shaped track portion 371 is provided with a lip 381 which engages the base of the channel portion 363 of the track portion 355. A ball 383 is provided at each end of the assembled track portions between the arcuate surface portions 361 and 375 thereof. At each end of the track portion 371 lanced-out inwardly formed stop elements 385 are provided for preventing the track portion element from moving beyond the balls. The track portion 355 has inwardly projecting tongues 387 spaced on either side of the balls 383 for limiting the movement of the ball relative to the track portion.

Bolts 389 have square shouldered portions 391 adjacent to the head 393 projecting through a square hole near each end and center of the track portion 371. A cup-shaped washer 395 has a central square hole which extends over the square shouldered portion 391 of the bolt 389 at the center of the track portion. The flanges 397 of the cup-shaped element extend over the latch element 369 which is free to pivot about the wall of the cup-shaped washer. The assembly is securely clamped in position when the seat is bolted to the track upon the washer 395. The latches 369 pivot about the washers 395 and are interconnected by an operating rod 399. One of the latches 369 has an offset operating arm 401 by which both of the latches are actuated against the pressure of springs 403 which urge the latch element into engagement with a notch 369 of the flange 365. When the actuating arm 401 is operated in a clockwise direction, it operates the opposite latch element in a counterclockwise direction for releasing both of the latch elements from the notches in the track portions 355 so that the seat with the track portions 371 may be adjusted upon the track portion 355 forwardly and rearwardly of the vehicle. After adjustment, the arm 401 is released, the springs return the latches to their original position into a notch 367 or adjacent thereto so that upon a slight forward or rearward movement of the seat the latch elements will engage the adjacent notch for securing the seat in the newly adjusted position.

By having both the track portions 355 provided with semicylindrical surfaces which face outwardly, and the track portions 371 with semicylindrical surfaces which face inwardly, the assembly of the two track elements on the balls 383 prevents the lateral shifting of the seat relative to the supporting track portions, and further lateral shifting is prevented by the engagement of the lip 381 of the flange 379 against the base of the channel element 363 of the track elements 359. In this manner, free longitudinal shifting movement of the seat upon the tracks is permitted while retaining the seat against lateral shifting.

The leg portion 357 at each end of the track element 359 is formed by extending the flange 365 and the adjacent web portion 405 downwardly to form the vertical web 407 and adjacent flange 409. The forward edge of the web 407 is flanged laterally at 411 and this flange 411 and the flange 409 are extended forwardly at 413 to form floor-engaging feet which are reinforced by embossed areas 415. In this construction a single stamping forms the floor engaging supporting track portions 355, while a single channel-shaped stamping forms the seat engaging track portions 371. Spacing washers 417 are provided on the bolts 389 at the forward and rear ends of the track element 371 to have the top surfaces thereof aligned with the top surface of the cup-shaped washers 395 when the base 419 of the seat is secured thereto. The track thus formed is smooth in operation, is stable against lateral shifting and is constructed of a minimum number of parts. The use of the square shoulder portion 391 and the cup-shaped washer 395 having the associated square aperture, forms a positive and economical means of securing the latch elements 369 onto the track portion when the seat is clamped thereon. The track elements thus provided are rugged in construction, positive in operation and economical of manufacture.

It will be observed that in each of the forms of the invention that have been described, the track constructions consist only of two members connected together by balls. These members may be inexpensively manufactured from sheet metal. Where there is a likelihood of spreading, the rebent flange arrangement of Figs. 1–10 and 15 to 17 may be employed to prevent distortion. The latch mechanism also may be formed from stampings and it is constructed so that identical parts are attached to each of the track assemblies regardless of whether it is used in the left or right side of the seat. Thus, interchangeability, simplicity, minimum number of parts, and mass production techniques are all promoted by the present invention.

It is evident that various structural changes may be made in the constructions illustrated without departing from the spirit and scope of the invention.

What is claimed is:

1. An adjustable track construction for automobile seats and the like comprising an outer and upper channel-shaped track member having a transverse web and downwardly extending vertical legs with outwardly formed bulges in each of the legs at the front and rear thereof extending lengthwise thereof, an inner and lower track member embraced by the upper member and between the legs thereof, said lower track member comprising a pair of substantially identical stampings each having a vertical web and being rigidly secured together back to back so that the webs are contiguous, said stampings having front and rear ball supporting surfaces formed in the webs thereof adjacent said bulges, and balls engaging said bulges and supported on the surfaces to transmit load from the upper to the lower track and to permit relative longitudinal movement therebetween.

2. An adjustable track construction for automobile seats and the like comprising an outer and upper channel-shaped track member having a transverse web and downwardly extending vertical legs with outwardly formed bulges in each of the legs at the front and rear thereof extending lengthwise thereof, an inner and lower track member embraced by the upper member and between the legs thereof, said lower track member comprising a pair of substantially identical stampings each having a vertical web and being rigidly secured together back to back so that the webs are contiguous, said stamping webs having outwardly pressed pockets formed therein extending lengthwise thereof and at the front and rear thereof, the upper transverse surfaces of which provide ball supporting surfaces adjacent said bulges, and balls engaging said bulges and supported on the surfaces to transmit load from the upper to the lower track and to permit relative longitudinal movement therebetween.

References Cited in the file of this patent

UNITED STATES PATENTS

| | | |
|---|---|---|
| 1,259,261 | Mears | Mar. 12, 1918 |
| 2,240,143 | Lustig | Apr. 29, 1941 |
| 2,285,616 | Saunders et al. | June 9, 1942 |
| 2,307,305 | Saunders et al. | Jan. 5, 1943 |
| 2,417,523 | Simpson | Mar. 18, 1947 |
| 2,579,597 | Moroney | Dec. 25, 1951 |